United States Patent [19]

Orlando

[11] 4,140,592
[45] Feb. 20, 1979

[54] GAS BEARING SURFACE COATING

[75] Inventor: Vincent A. Orlando, Clearwater, Fla.

[73] Assignee: The United States of America as represented by the Secretary of the Air Force, Washington, D.C.

[21] Appl. No.: 891,800

[22] Filed: Mar. 30, 1978

[51] Int. Cl.$^2$ .................... B21D 53/10; C25D 11/34; C23C 15/00
[52] U.S. Cl. .................... 204/56 R; 29/149.5 A; 29/149.5 S; 204/192 C; 308/DIG. 1; 308/DIG. 8
[58] Field of Search ............ 204/56 R, 192 R, 192 C; 29/149.5 A, 149.5 S, 149.5 R; 308/DIG. 1, DIG. 8

[56] References Cited

U.S. PATENT DOCUMENTS

| | | | |
|---|---|---|---|
| 3,242,742 | 3/1966 | Parker | 308/DIG. 1 |
| 3,375,179 | 3/1968 | Pittman | 204/56 R |
| 3,694,331 | 9/1972 | Csontos et al. | 204/56 R |
| 3,726,572 | 4/1973 | Beardmore | 308/DIG. 1 |
| 4,005,914 | 1/1977 | Newman | 308/DIG. 1 |

Primary Examiner—John H. Mack
Assistant Examiner—William Leader
Attorney, Agent, or Firm—Joseph E. Rusz; William J. O'Brien

[57] ABSTRACT

A method for increasing the life and reliability of beryllium gas bearings by applying a coating of chromium to one bearing surface and an anodized beryllium coating to its mating surface.

6 Claims, No Drawings

GAS BEARING SURFACE COATING

STATEMENT OF GOVERNMENT INTEREST

The invention described herein may be manufactured and used by or for the Government for governmental purposes without the payment of any royalty thereon.

BACKGROUND OF THE INVENTION

This invention relates to gas bearing surfaces and to a method for coating the same. More particularly, this invention concerns itself with a method for coating gas bearing surfaces of gyroscopic instruments for the purpose of increasing life and reliability.

Gas bearings characteristically exhibit a long operational life which makes them especially useful for a variety of industrial applications. The long life characteristic is dependent primarily on the type of material which makes up the bearing surface. Gyroscopic instruments, which utilize gas bearings, are often made of solid materials. The use of a solid material is beneficial for the gas bearing; but, is otherwise detrimental from a cost and performance standpoint with regard to the gyroscope. Consequently, most gyroscopic instruments presently made are fabricated from solid materials for the benefit of the gas bearing.

To alleviate the restrictions imposed by the use of solid materials and provide good gas bearing performance, gyroscopic instruments are becoming more common which use a surface coating suitable for gas bearing performance when applied to a bulk material such as beryllium. The beryllium is lightweight, easier to machine, has better thermal characteristics and possesses other desirable features which improve instrument characteristics. A considerable research effort, therefore, has been undertaken in an attempt to find a suitable surface coating method that will prolong the operational life of gas bearings and improve their overall performance characteristics. The present invention provides a solution to this problem by applying an anodized coating to one gas bearing surface and a sputtered coating of chromium on the mating surface.

SUMMARY OF THE INVENTION

In accordance with this invention, it has been found that the performance and operational life of gyroscopic instruments incorporating hydrodynamic spin bearings can be greatly improved by a coating process which involves coating one surface of the bearing with about 50 microinches of anodized beryllium and its mating surface with about 60 microinches of chromium.

Accordingly, the primary object of this invention is provide a method for improving the operational life and performance characteristics of gas bearings used as an integral part of gyroscopic instruments.

Another object of this invention is to provide a method for coating one surface of a gas bearing with anodized beryllium and its mating surface with chromium.

The above and still other objects and advantages of the present invention will become more readily apparent upon consideration of the following detailed disclosure thereof.

DESCRIPTION OF THE PREFERRED EMBODIMENT

The above-defined objects of this invention are accomplished by a method which involves the application of an anodized coating to one surface of a gas bearing and a sputtered coating to the mating surface of the bearing. For the purposes of this invention, the rotating part of the gas bearing is defined as the rotor while the normally stationary part of the bearing is referred to as the stator. The invention consists of coating the rotor bearing surface with from about 5 to 100 microinches of sputtered chromium and the surface of the stator part with about from 50 to 100 microinches of anodized beryllium. The base materials of both the rotor and stator is solid beryllium. These two materials have previously been used as coatings on bearing surfaces but not in the same gas bearing and not applied as used herein. This invention relates to the optimum nature of this combination; and the uniqueness of the combination is described hereinafter.

The process of providing an anodized coating to a beryllium surface is relatively simple and well-known. The anodized surface reproduces the dimensions and smoothness of the basic beryllium surface on which it is applied. Adhesion has been shown to be excellent. Also discovered during the study in which this invention was conceived is that certain lubricants, such as triethanolamine stearate, when applied to anodized beryllium, form chemically stable bonds which are very tenacious. A specific percentage of the anodized volume becomes impregnated with this stable lubricant and serves as a reservoir. The anodized coating also protects the beryllium from corrosion and its porosity is small, resulting in a bearing having high load carrying capability.

The anodizing process utilized in applying the anodized coating is well known and forms no part of this invention. Its details, however, are set forth in the following description of a conventional anodizing process. Immediately before anodizing, the bearing surface to be coated is rinsed in deionized water (DI), immersed in 1% by volume sulfuric acid for three seconds, then rinsed in DI water. A positive electrode is then connected to the surface which is held in a fixture. It is immersed in an electrolyte containing 333.0 gms chromium trioxide ($CrO_3$), 30 gms potassium dichromate ($K_2CR_2O_7$) and DI water to make a total volume of 3,000 milliliters. A current is then applied for ten minutes at 1.2 amperes per square inch of surface to be anodized. The electrolyte is maintained at $-3°$ C. The bearing surface is then removed from the fixture, rinsed in DI water, dipped in alcohol, blown dry with nitrogen and vacuum baked at 80° C. for 2 hours. Although an anodized beryllium thickness of from 50 to 100 microinches was found acceptable, the optimum thickness was found to be about 50 microinches.

In the prior gas bearing surfaces, anodized beryllium is used in conjunction with solid pyroceram. The beryllium metal, however, has been shown to have a tendency to alloy with the glasslike pyroceram causing softer, lower melting-point material. This tendency, added to the high thermal insulating properties of pyroceram, tends to generate micro-hot spots which are believed to fracture the pyroceram on a micro scale forming debris in the bearing. This micro heating also causes the lubricant to decompose, thus increasing the debris in the bearing. In addition, the thermal expansion of pyroceram does not ideally match beryllium and it is heavier. In an attempt to overcome these defects it was suggested that beryllium be substituted for the pyroceram. However, bare beryllium tends to corrode causing chemical decomposition of the lubricant. Anodizing the rotor to operate against the anodized stator has met with only limited success.

In a further attempt to solve this problem, it was suggested that a different coating metal be applied to the mating surface of the beryllium anodized surface since it is known that in metal bearings, those with mating surfaces of different materials tends to have a longer life. Chromium was suggested since it is a smooth, hard material which has been used to coat gas bearing surfaces in the past. It is usually applied by electroplating and to a relatively great thickness (0.010 inches). The surfaces are then machined and finished. However, the electroplating process tends to leave impurities in the coating and it tends to crack. It is a rather complex and expensive process and the machining required to produce a finished product is also costly. This suggestion likewise failed to provide a practical solution to the problem of improving gas bearing life and operability.

Upon further research, however, it was unexpectedly discovered that by applying the chromium by sputtering to a depth of about 5 to 100 microinches, no finishing of the surface was required after coating except for a simple buffing to defuzz the sputtered surface. The adhesion was excellent. There was no tendency to crack and no electrolytes or other potential impurities were involved in the process. From an optimum standpoint, a chromium thickness of about 60 microinches was found preferable.

The unique combination of an anodized beryllium coating of a particular depth on one surface of a beryllium base gas bearing with a sputtered chromium coating of a particular thickness applied to its mating surface has proven to be highly successful in solving the problems associated with previously known gas bearing surfaces. The sputtering process, itself, is well known in the prior art and does not constitute a part of this invention. Briefly, an example of the conventional sputtering technique found useful in providing the chromium coating of this invention is set forth below.

The bearing surface to be coated is mounted in a holding fixture inside a sputtering system about 2 inches from a target. The target is composed of the chromium material which will be deposited on the part. A vacuum in the range of $10^{-5}$ Torr pressure is obtained in the chamber. A sputtering gas such as argon is bled into the system to a pressure of $4 \times 10^{-3}$ Torr. An rf potential is applied to the chromium target which attracts ionized sputtering gas atoms. These energetic atoms eject target atoms from the sputter target which then deposit onto the bearing parts. The parts have a DC bias potential as high as 300V to promote adhesion of the sputter material to the surface of the parts. The potential which is applied to the sputter target is at the power level of 100 to 500 watts when rf sputtering is done.

In some cases more than one coating may be applied, if desired. The first material is selected to have good adhesion to the bearing parts and to the final bearing coating. The final coating is selected because of its superior bearing qualities. This multilevel coating technique allows otherwise incompatible materials to be used in a fashion to gain the advantages of both. For example, the adhesion of chrome to beryllium is enhanced by the use of an intermediate coating of nickel or a nickel alloy such as nichrome.

The temperature of the parts during the sputtering process may be in the range of 200° to 500° F. The upper limit is maintained by heat-sinking the parts and by controlling the power level, gas pressure, and bias on the bearing parts. The coating rate is measured on test parts prior to coating the actual bearing parts. Sputtering parameters which include process time are coordinated to give the selected coating thickness, typically 5-100 microinches. Once the coating is completed, the gas is pumped out. The parts are allowed to slowly cool in a partial vacuum. The system is eventually vented to atmosphere and the parts are removed.

Gas bearings of both spool and hemispherical configuration have been fabricated using the method of this invention. They have exhibited life characteristics much more stable than the coated bearings of the prior art which the novel coated bearings of this invention was designed to replace. Also, the overall costs involved in applying the coatings of this invention are significantly less.

While the invention has been described with particularity in reference to a specific embodiment thereof, it is to be understood that the disclosure of the present invention is for the purpose of illustration only and is not intended to limit the invention in any way, the scope of which is defined by the appended claims.

What is claimed is:

1. A method for increasing the operational life and reliability of beryllium base gas bearings composed of a rotor component and a stator component which comprises:

(a) forming a thin anodized beryllium coating on the surface of said stator; and (b) applying a thin, sputtered chromium coating to the surface of said rotor which is in mating contact with the surface of said stator.

2. A method in accordance with claim 1 and further including the application of an intermediate coating of a nickel-containing alloy to said rotor prior to the application of said chromium coating.

3. A method in accordance with claim 1 wherein said chromium coating is applied to a depth of about 5 to 100 microinches.

4. A method in accordance with claim 1 wherein said beryllium coating is applied to a depth of about 50 to 100 microinches.

5. A method in accordance with claim 3 wherein said chromium coating is applied to a depth of about 6 microinches.

6. A method in accordance with claim 4 wherein said beryllium coating is applied to a depth of about 50 microinches.